United States Patent
Morishita

(10) Patent No.: US 12,395,026 B2
(45) Date of Patent: Aug. 19, 2025

(54) STATOR FOR SUPPRESSING PEELING OF INSULATING COATING

(71) Applicant: DENSO CORPORATION, Kariya (JP)

(72) Inventor: Kazuki Morishita, Kariya (JP)

(73) Assignee: DENSO CORPORATION, Kariya (JP)

( * ) Notice: Subject to any disclaimer, the term of this patent is extended or adjusted under 35 U.S.C. 154(b) by 268 days.

(21) Appl. No.: 17/880,294

(22) Filed: Aug. 3, 2022

(65) Prior Publication Data
US 2023/0045189 A1  Feb. 9, 2023

(30) Foreign Application Priority Data
Aug. 3, 2021 (JP) ................... 2021-127815

(51) Int. Cl.
*H02K 3/28* (2006.01)

(52) U.S. Cl.
CPC ..................... *H02K 3/28* (2013.01)

(58) Field of Classification Search
CPC .. H02K 3/20; H02K 3/28; H02K 3/40; H02K 3/50; H02K 3/505; H02K 2203/06; H02K 3/00
USPC ................................. 310/196, 201
See application file for complete search history.

(56) References Cited

U.S. PATENT DOCUMENTS

| | | |
|---|---|---|
| 2011/0181144 A1 | 7/2011 | Ishizuka et al. |
| 2020/0112236 A1* | 4/2020 | Hirao ............ H02K 15/04 |

FOREIGN PATENT DOCUMENTS

| | | | | |
|---|---|---|---|---|
| DE | 102020123607 A1 * | 3/2021 | ............ | B21D 28/28 |
| JP | 5559553 B2 * | 7/2014 | | |
| JP | 2019-134539 A | 8/2019 | | |

OTHER PUBLICATIONS

Machine Translation of DE-102020123607-A1 (Year: 2021).*
Machine Translation of JP 5559553 B2 (Year: 2014).*

* cited by examiner

*Primary Examiner* — Alexander A Singh
*Assistant Examiner* — Charlie Frank Mann, Jr.
(74) *Attorney, Agent, or Firm* — Oliff PLC

(57) ABSTRACT

A stator includes a stator core and a stator winding installed in the stator core. The stator winding has multiple conductor segments in which a conductor is coated with an insulating film 35. The conductor segment includes an exposed portion in which the conductor is exposed at its leading end, and a covered portion in which the conductor remains coated with the insulating film. At a coil end section of the stator winding, the exposed portions of different conductor segments are engaged with each other. A depression as a plastic deformation formed by crushing at least a part of the insulating film is provided at an edge of the covered portion of the conductor segment, located closer to the leading end of the conducting wire, thereby Providing a stator capable of suppressing peeling off of the insulating film and ensuring insulation reliability of the stator winding.

5 Claims, 8 Drawing Sheets

STATOR FOR SUPPRESSING PEELING OF INSULATING COATING

CROSS-REFERENCE TO RELATED APPLICATION

This patent application is based on and claims priority to Japanese Patent Application No. 2021-127815, filed on Aug. 3, 2021 in the Japan Patent office, the entire disclosure of which is hereby incorporated by reference herein.

BACKGROUND

Technical Field

The present disclosure relates to a stator employed in a rotation electric machine.

Related Art

In a stator employed in a rotation electric machine, a stator winding is installed in a stator core. The stator winding is generally configured by connecting multiple conductor segments to each other. Such a conductor segment is constituted by a conducting wire configured by including a conductor coated with an insulating film. The conductor segment has both an exposed portion at a leading end thereof in which the conductor is exposed and a covered portion in which the conductor remains coated with an insulating film. Then, the conductor segment is connected to another conductor segment at the exposed portion thereof. In a known insulating film coated on a conductor segment, to increase a creepage distance between adjacent joints, an insulating film peeling off portion peels off from a conductor while inclining to a given direction.

In general, an insulating film possibly peels off at an edge of the covered portion closer to the exposed portion in the conductor segment. For example, when conductor segments are mutually joined together in a manufacturing process, an insulating film can peel off due to contact of other parts or the like at an edge of the insulating film. In the known technology, since an insulating film peeled off portion inclines to the conductor, the insulating film can increasingly peel off starting from the insulating film peeling off portion. When the insulating film peels off from the covered portion, insulation reliability may possibly decrease.

The present disclosure has been made to address and resolve such a problem, and it is a main object of the present disclosure to provide a stator capable of suppressing peeling off of an insulating film while ensuring insulation reliability of a stator winding.

SUMMARY

Accordingly, one aspect of the present disclosure provides a novel stator that includes: a stator core; and a stator winding installed in the stator core. The stator winding is configured by including multiple conducting wires constituted by conductors respectively coated with insulating films. Each of the conducting wires has; an exposed portion at a leading end, where the conductor is exposed, and a covered portion in which the conductor remains coated with the insulating film. A pair of exposed portions of different conductor wires are joined together at a coil end section of the stator winding. The covered portion of the conducting wire of each of different conductor wires has a depression as a plastic deformation at an edge thereof closer to the leading end of the conducting wire, the depression being formed by crushing a part of the insulating film at the edge of the covered portion.

Hence, according to a first aspect of the present disclosure, the depression as a plastic deformation is formed at the edge of the covered portion of the conducting wire closer to the leading end thereof by crushing at least a part of the insulating film. Accordingly, in this configuration, the edge of the insulating film adheres to the conductor, thereby inhibiting the insulating film from easily peeling accidentally. Hence, occurrence of the peeling off of the insulating film in the covered portion can be suppressed, thereby ensuring insulation reliability of the stator winding.

Accordingly, in another aspect of the present disclosure, the depression has a given depth measured from the insulating film of the covered portion to a part of the conductor directly under the insulating film.

Hence, according to the second aspect of the present disclosure, the depression is formed with the depth measured from the insulating film of the covered portion to a part of the conductor directly under the covered portion. In this configuration, since the depression is formed in the conductor as a plastic deformation and the edge of the insulating film enters the depression of the conductor, adhesion of the insulating film to the conductor is improved. With this, it is possible to further reduce peeling off of the insulating film.

According to a third aspect of the present disclosure, the conductor wire is a rectangular conductor wire having a rectangular cross-section. The coil end section is configured by connecting a leading end of the conductor wire extended in a first circumferential direction and a leading end of the other conductor wire extended in a second circumferential direction opposite to the first circumferential direction at an axially outside of the stator core. The exposed portions of the different conductor wires are engaged side by side with each other in a radial direction of the stator core and are joined together by welding. The depression is formed on surfaces of the covered portion facing to the axial and radial directions, respectively, at the edge of the covered portion closer to the leading end of the conducting wire in each of the different conductor wires. That is, in a configuration in which the exposed portion is formed at the leading end of each of the conducting wires oppositely extended in the circumferential direction and these exposed portions are joined together, respective edges of the insulating films closer to leading ends of the conducting wires can peel off due to a contact between these conducting wires or the like. However, according to this aspect of the present disclosure, since the depressions are formed on the respective surfaces of the covered portions of the conducting wires, which face perpendicular to both axial and radial directions, respectively, at the edges of the covered portions closer to the leading ends of the conducting wires, peeling off of the insulating film caused by the contact between the conducting wires and the like can be favorably reduced or suppressed.

According to a fourth aspect of the present disclosure, the depression serves as a positioning member for positioning the exposed portions when the exposed portions of different conducting wires are joined together.

Hence, according to the fourth aspect of the present disclosure, the depression serves as the positioning member for positioning the exposed portion of the different conducting wire when the exposed portions are mutually engaged with each other. Here, when the edge of the covered portion closer to the leading end of the conducting wire is used in alignment of the exposed portion of the different conducting wire, the exposed portion comes into contact with the edge of the covered portion closer to the leading end of the different conducting wire, so that the insulating film is likely to peel off. However, according to the fourth aspect of the present disclosure, since the depression is formed at the edge of the covered portion closer to the conducting wire leading end, peeling off of the insulating film can be reduced or suppressed even if the exposed portion comes into contact with the edge of the covered portion of the different conducting wire.

According to a fifth aspect of the present disclosure, the conducting wires are extended in the first and second circumferential directions and are also extended outwardly in the axial direction obliquely to an axial end face of the stator core at a given angle. Then, the exposed portions of the leading ends of the different conducting wires are joined together. Further, among two depressions formed on two opposite surfaces perpendicular to the axial direction at the edge of the covered portion located closer to the leading side of the conducting wire, the depression formed on the axial inner surface is located closer to the leading end of the conducting wire in the longitudinal direction of the conducting wire than the depression formed on the axial outer surface.

That is, in a configuration in which conducting wires are extended oppositely in the circumferential direction and axially outward in the axial direction obliquely to an axial end face of the stator core at a given angle, and the exposed portions of the leading ends thereof are joined together, the closer to the leading ends of the conductor wires, the more the conducting wires are located outside in the axial direction. Hence, in such a situation, the further outward in the axial direction, the higher the risk of coming into contact with other components than the stator, and ultimately, the insulating film is increasingly likely to peel off due to the contact. In view of this, according to a fifth aspect of the present disclosure, among multiple depressions formed on the two axial surfaces (i.e., surfaces perpendicular to the axial direction) at the edge of the covered portion closer to the leading end of the conducting wire, the depression formed on the axial inner surface of the conducting wire is closer to the leading end of the conducting wire in a longitudinal direction thereof than the depression formed on the axial outer surface of the conducting wire. With this, the risk of parts other than the stator coming into contact with the edge of the covered portion closer to the leading end of the conductor wire (i.e., the depression) on the axial outer surface of the conductive wire can be decreased. Hence, peeling off of the insulating film can be more appropriately suppressed.

According to a sixth aspect of the present disclosure, the exposed portion is configured to include a recess formed at a boundary with the covered portion partially to constitute the depression, and a protrusion formed closer to the leading end of the conducting wire than the recess is.

Hence, according to the sixth aspect of the present disclosure, in the exposed portion, a recess as a depression is formed at the boundary with the covered portion, and a protrusion is successively formed at a position closer to the leading end of the conducting wire than the recess, so that other conductor wires and the like are prevented from coming into contact with the edge of the insulating film. With this, peeling off of the insulating coating from the conducting wire can be readily reduced or suppressed.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
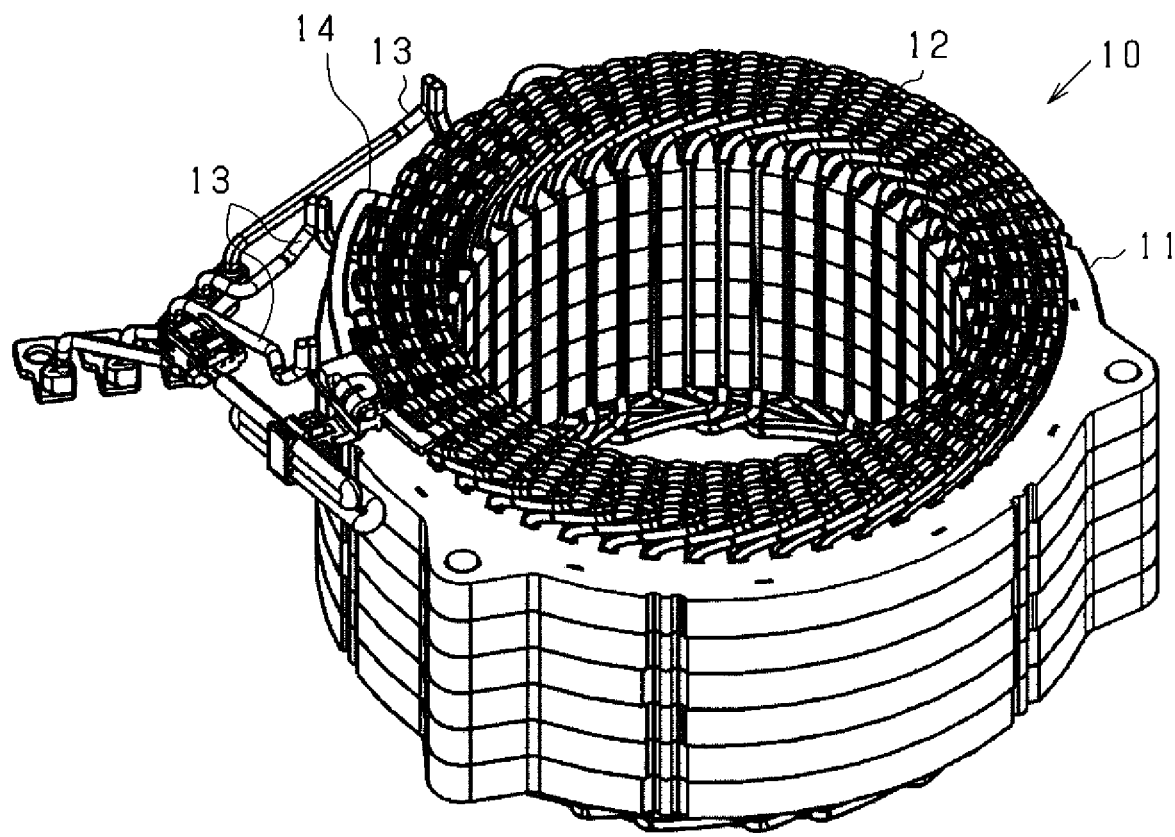
FIG. 1 is a perspective view illustrating an exemplary stator according to one embodiment of the present disclosure.

Referring now to the drawings, wherein like reference numerals designate identical or corresponding parts throughout the several views thereof and to FIGS. 1 to 9B, a rotating electric machine according to one embodiment of the present invention will be described. Hereinbelow, in various embodiments and modifications, the same or equivalent portions are given the same reference numerals. Then, a portion having the same reference numeral is not described repeatedly while making a reference thereto. In this embodiment, a motor acting as a rotating electric machine is used, for example, as an electric motor for either a vehicle or an aerial vehicle.

The rotating electric machine has a three-phase winding and can be applied to a permanent magnet synchronous motor, a winding field type motor, and an induction machine. The rotating electric machine includes a cylindrical stator 10 shown in FIG. 1 and a rotor (not shown) disposed in a radial inner part of the stator 10 or the like. The rotor is opposed to the stator 10 and is rotatable around a rotation axis. Hereinafter, an axial direction refers to an axial direction of the stator 10, that is, an axial direction of the rotation axis of the rotor. A radial direction refers to a radial direction of the stator 10, that is, a direction passing through a center of the rotation axis of the rotor and orthogonal to the rotation axis. A circumferential direction indicates a circumferential direction of the stator 10, that is, a rotational direction of the rotor around the rotation axis.

Figure 2:
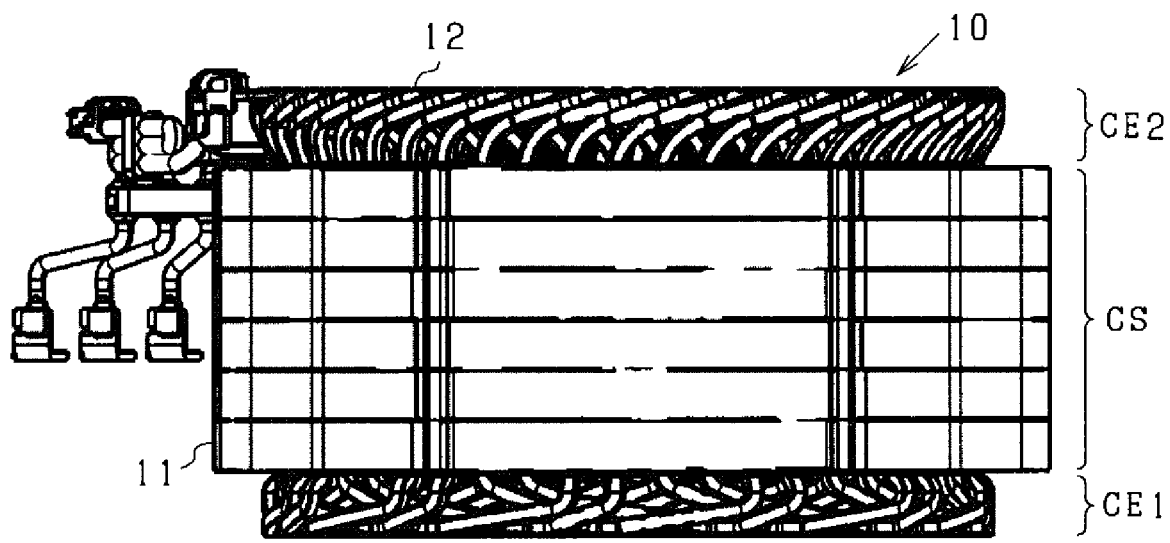
FIG. 2 is a front view illustrating the stator of FIG. 1.

As shown in FIGS. 1 and 2, the stator 10 includes a stator core 11 having an annular shape and a stator winding 12 wrapped around the stator core 11. The rotating electric machine of the present disclosure is an inner-rotor type rotary electric machine, in which the rotor is rotatably arranged radially inside of the stator 10. The stator winding 12 is a type of a three-phase winding configured by including a U-phase winding, a V-phase winding, and a W-phase winding as respective phase windings. A power line busbar 13 is connected to one end of the phase winding of each phase. A neutral point busbar 14 is also connected to the other end of the phase winding of each phase. Among a total extent of the stator winding 12, a range overlapping with the stator core 11 in the axial direction serves as a slot inside coil section CS. Among the total extent of the stator winding 12, portions located outside of the stator core 11 in the axial direction serve as coil end sections CE1 and CE2, respectively.

Figure 3:
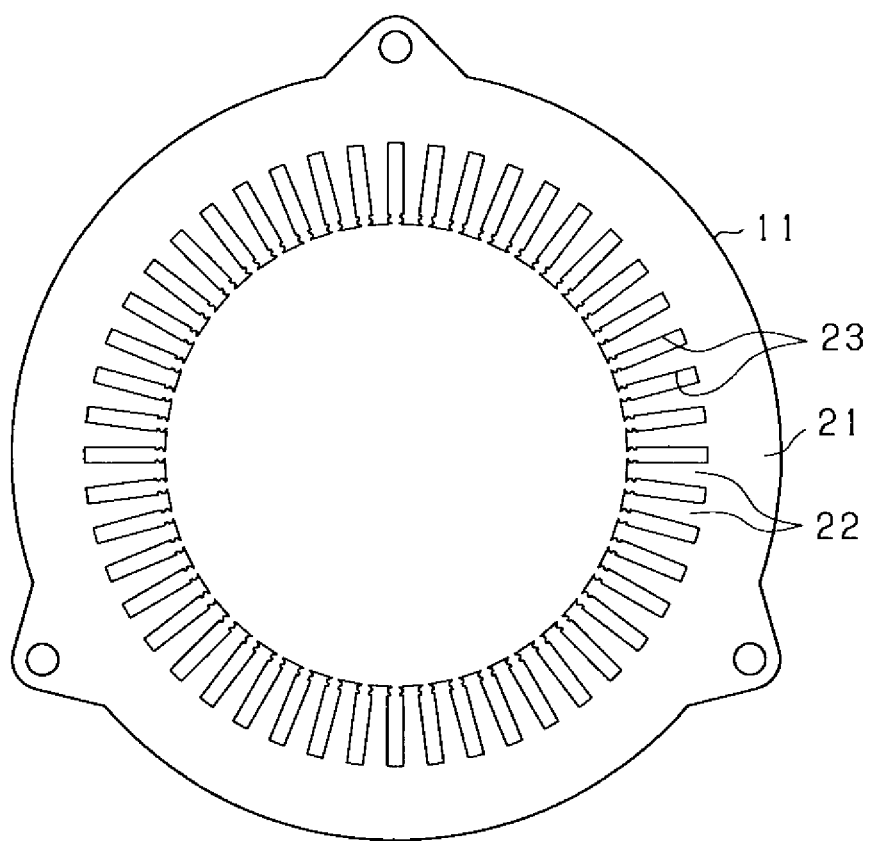
FIG. 3 is a plan view illustrating an exemplary stator core according to one embodiment of the present disclosure.

As shown in FIG. 3, the stator core 11 includes an annular back yoke 21 and multiple teeth 22 radially protruding inwardly from the back yoke 21 and arranged apart from each other at a given distance in the circumferential direction. Hence, the stator core 11 includes multiple slots 23 formed between respective adjacent teeth 22. Each of the slots 23 has an opening with a longitudinal side extending in the radial direction, and is arranged at substantially the same intervals in the circumferential direction in the stator core 11. Then, the stator winding 12 is wrapped around each of the slots 23. The stator core 11 is configured as a core sheet laminate, formed by laminating core sheets in the axial direction to act as a magnetic body constituted by electromagnetic steel sheets, for example.

The stator winding 12 is configured by connecting three-phase windings by a method of Y-letter wire connection (i.e., star-shaped connection). The stator winding 12 generates magnetic fluxes when power (i.e., AC power) is supplied from a power supply via an inverter (not shown). The stator winding 12 is configured by using multiple conductor segments 30 configured by including substantially U-shaped split conductors. Hereinafter, a segment structure of the stator winding 12 will be described in detail.

Figure 4:
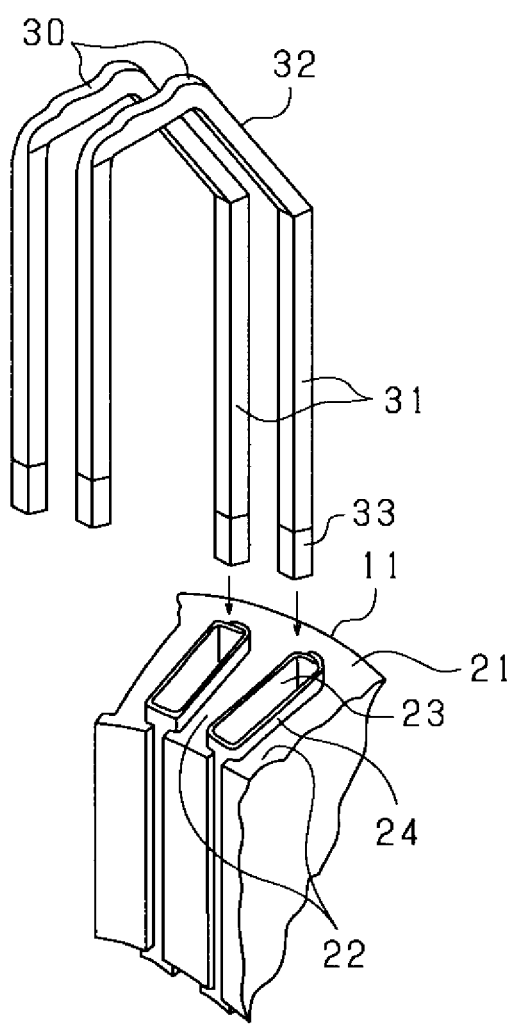
FIG. 4 is a perspective view illustrating conductor segments and a part of the stator core according to one embodiment of the present disclosure.

FIG. 4 is a perspective view illustrating the conductor segments 30 (30) and a part of the stator core 11. As shown in FIG. 4, the conductor segment 30 has a pair of linear portions 31 and a turn portion 32 bent to connect the pair of linear portions 31 each other, thereby substantially forming a U-shape. Each of the pair of linear portions 31 has an overall length longer than an axial thickness of the stator core 11. The conductor segment 30 is configured by using a rectangular conductor produced by coating a conductor having a rectangular cross section (i.e., a conductor having a pair of opposing planar portions) with an insulating film. A leading end of each of linear portions 31 serves as an exposed portion 33 where the conductor is exposed by removing the insulating film from the linear portion 31.

Then, multiple conductor segments 30 are inserted into given slots 23 of the stator core 11, and are radially aligned therein in a row. In this embodiment, six layers of linear portions 31 of the conductor segments 30 are accommodated in the slots 23 as a laminate. The pair of linear portions 31 of the conductor segment 30 is housed in given two slots 23 separated by a given coil pitch, respectively. Among the entire portion of the linear portion 31, a portion accommodated in the slot 23 corresponds to a slot inside coil section CS of the stator winding 12. Here, in the slot 23, an insulating sheet 24 is disposed to electrically insulate the stator core 11 from the stator winding 12 (i.e., the conductor segments 30). Specifically, the insulating sheet 24 is disposed in the slot 23 between an inner peripheral surface (i.e., an inner wall surface) of the stator core 11 and the conductor segment 30 and is folded completely to surround multiple conductor segments 30 inserted into the slot 23.

Further, the pair of linear portions 31 of the conductor segment 30 are positioned in the two respective slots 23 by relatively shifting a radial position by an amount of one coil. For example, when one of the linear portions 31 is accommodated at an n-th position counted from a radial back side (i.e., a side of the back yoke), the other one of the linear portions 31 is accommodated at a n+1-th position counted from the radial back side.

Further, each conductor segment 30 is inserted into given slots 23 of the stator core 11 as described below. That is, the linear portion 31 of each conductor segment 30 is inserted from a first end of the stator core 11 out of first and second ends respectively located at both ends of the stator core 11 in the axial direction. Then, a leading end of each of the linear portions 31 protrudes from the second end of the stator core 11 in the axial direction. With this, facing the first end of the stator core 11, one of coil ends CE1 is formed by the turn portion 32 of the conductor segment 30. By contrast, axially outside of the second end of the stator core 11, the other one of coil end sections CE2 is formed. That is, at the coil end section CE2, an opposite end (hereinafter simply referred to as a non-turn portion) of each linear portion 31 opposite to the turn portion 32 is bent in the circumferential direction and connected to a linear portion 31 of another conductor segment 30 as also bent. An outline of each of the coil ends CE1 and CE2 is illustrated in FIG. 2.

Next, an exemplary connection process of connecting conductor segments 30 at the coil end section CE2 will be hereinbelow described in more detail. Initially, the exemplary connection process performed between conductor segments 30 will be briefly described.

Figure 5:
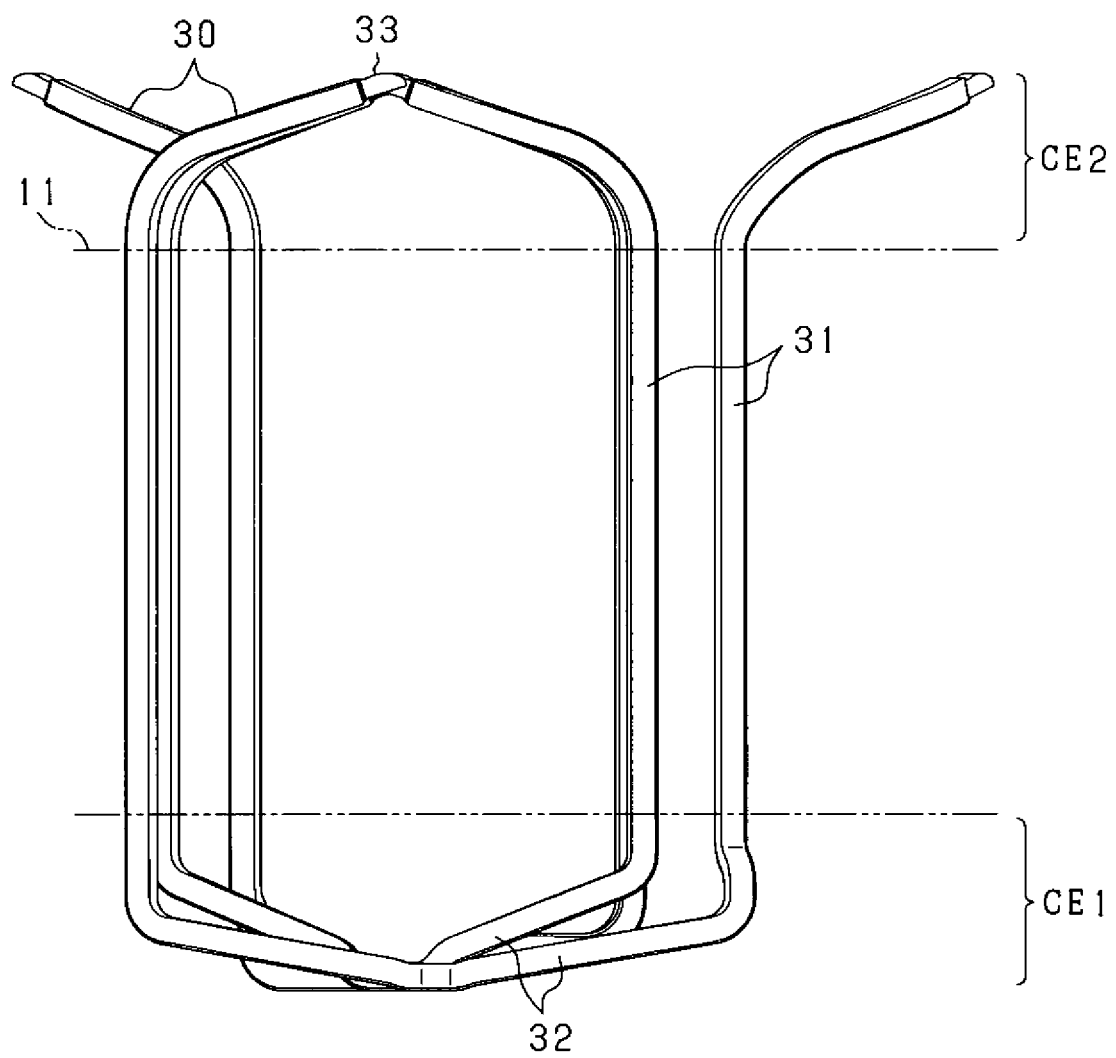
FIG. 5 is a diagram illustrating some conductor segments accommodated in a slot according to one embodiment of the present disclosure.

FIG. 5 is a diagram illustrating some conductor segments 30 housed in given slots 23. In the drawing, the stator core 11 is shown by virtual lines, for convenience. As shown, non-turn portions of a pair of linear portions 31 of the conductor segment 30 protrude from the axial end face (i.e., an upper end face in the drawing) of the stator core 11. The non-turn portions of the pair of linear portions 31 are then obliquely bent in the circumferential direction at a given angle formed from the core end face. Then, conductor exposed portions 33 located at leading ends of different conductor segments 30 respectively are joined together by welding, thereby causing the multiple conductor segments 30 to connect to each other.

Further, as shown, at the coil end section CE2, a leading end of the conductor segment 30 extended in a first circumferential direction at an outside of the stator core 11 in the axial direction and a leading end of the other conductor segment 30 extended in a second circumferential direction opposite to the first circumferential direction are joined together. With this, at the coil end section CE2, a leading end of the linear portion 31 of the conductor segment 30 of the stator winding 12 is bent and extends obliquely to the axial direction and is folded back (i.e., turned) at a given top position. Hence, each of the linear portions 31 of the conductor segment 30 is bent differently as described below. That is, a leading end of a linear portion 31 closer to the non-turn portion is bent to the same side in the circumferential direction as the turn portion 32. By contrast, a leading end of another linear portion 31 closer to the non-turn portion is oppositely bent in the circumferential direction in which the turn portion 32 is bent.

Next, an exemplary configuration of a leading end of the conductor segment 30 will be described more in detail.

Figure 6A:
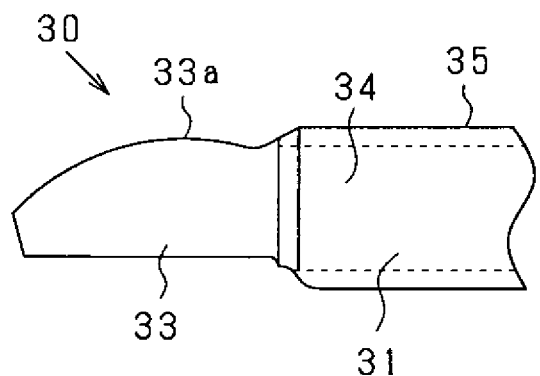
FIGS. 6A and 6B are diagrams collectively illustrating a basic connection mechanism connecting the conductor segments according to one embodiment of the present disclosure.
Figure 6B:
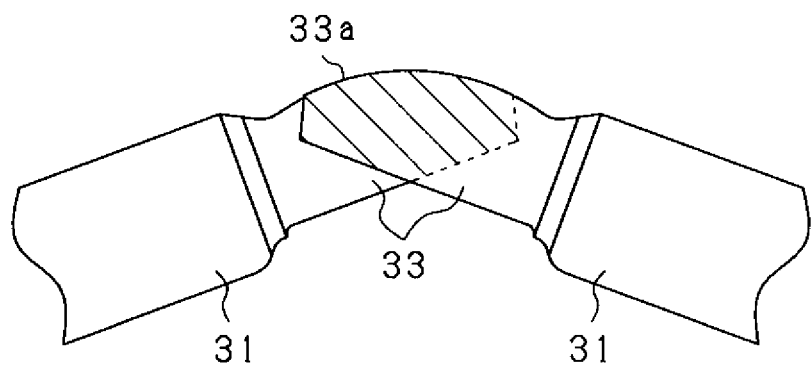

FIGS. 6A and 6B are diagrams collectively illustrating a basic configuration of conductor segments 30 connected to each other. As shown in FIG. 6A, the conductor segment 30 is configured by including a linear conductor 34 and an insulating film 35 covering the conductor 34. The conductor 34 is exposed at a leading end of the conductor segment 30 to provide an exposed portion 33 of the conductor segment 30. In the conductor segment 30, a portion other than the exposed portion 33 serves as a covered portion 36 in which the conductor 34 is coated with the insulating film 35. In the exposed portion 33, an axial outer surface 33a providing an axially outer surface (i.e., an upper surface in the drawing) has an arc shape with a convex protruding outside in the axial direction. Further, each of surfaces of the exposed portion 33 other than the axial outer side 33a, that is, an axial inner side, a radial outer side, and a radial inner side of the conductor exposed portion 33 provide flat surfaces.

Then, as shown in FIG. 6B, the exposed portions 33 of the respective conductor segments 30 are superimposed and engaged with each other in the radial direction. Then, these the exposed portions 33 are joined together by laser welding maintaining the engaging state. In such a situation, the exposed portions 33 are joined to each other with the axial outer surfaces 33a substantially coinciding with each other. Then, laser welding is performed on the axial outer surfaces 33a (i.e., upper surfaces in the drawing) as the laser irradiation surface. Here, each of portions among the exposed portions 33 of the respective conductor segments 30 opposed to each other has a horizontally long shape longer in the circumferential direction than in the axial direction. Hence, at a time of laser welding, laser scanning is applied within a given range in the circumferential direction along an arc-shaped axial outer surface 33a.

In such a situation, however, with the configuration shown in FIGS. 6A and 6B, there is a risk that an insulating film 35 of the covered portion 36 may unintentionally peel off at a boundary between the covered portion 36 and the exposed portion 33. For example, when the exposed portion 33 is formed at a leading end of the conductor segment 30 by peeling off the insulating film 35, a burr-like surplus portion can remain in the insulating film 35. In such a situation, the insulating film 35 is likely to be accidentally peeled off when the surplus portion is caught by something. Also, the insulating film 35 may probably peel off when an exposed portion 33 of another conductor segment 30 comes into contact with an edge of the covered portion 36 closer to the leading end of the conductor. Here, in FIG. 6, the edge of the insulating film 35 closer to the exposed portion 33 is chamfered, so that it is expected that the insulating film 35 can hardly peel off due to the chamfer.

However, another configuration capable of more reliably suppressing peeling off of the insulating film 35 is demanded.

Hence, according to one embodiment of the present disclosure, a plastic deformation depression 37 is formed at the edge of the covered portion 36 of the conductor segment 30 closer to the exposed portion 33. The plastic deformation depression 37 has a depth measured from the insulating film 35 of the covered portion 36 to a part of the conductor 34 directly under the insulating film 35. Hence, unintended peeling off of the insulating film 35 can be reduced or suppressed as described hereinbelow more in detail.

Figure 7A:
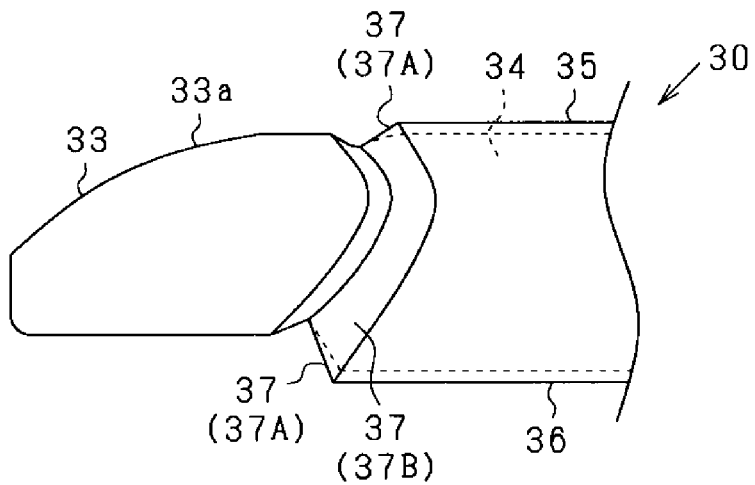
FIGS. 7A to 7C are diagrams collectively illustrating a configuration of a leading end of the conductor segment according to one embodiment of the present disclosure.
Figure 7B:
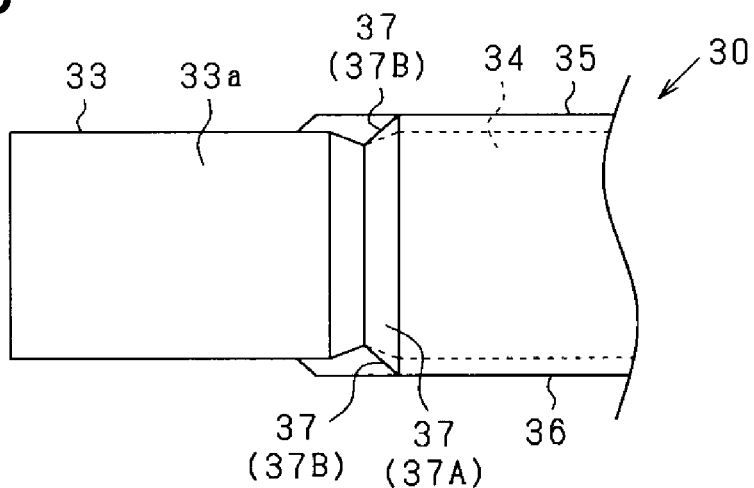
Figure 7C:
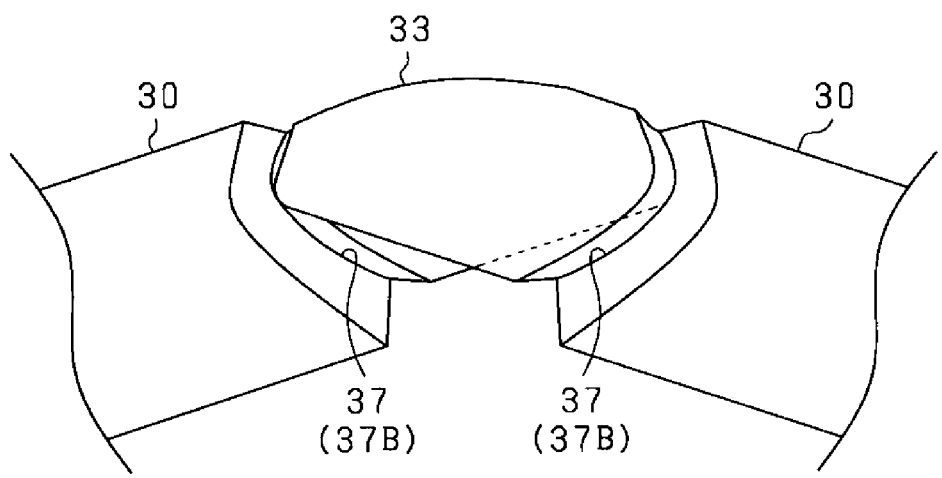

FIGS. 7A to 7C are diagrams collectively illustrating a configuration of a leading end of the conductor segment 30 of the present disclosure obtained by partially modifying the configuration shown in FIGS. 6A and 6B. That is, FIG. 7A is a diagram illustrating the leading end of the conductor segment 30 when viewed in the radial direction (i.e., viewed from a front side in FIG. 2). FIG. 7B is a diagram illustrating the leading end of the conductor segment 30 when viewed from an outside thereof in the axial direction (i.e., viewed from above the stator 10 in FIG. 2). FIG. 7C is a diagram illustrating a connected condition in which leading ends of the conductor segments 30 are engaged with each other.

As shown in FIGS. 7A and 7B, each of the conductor segments 30 has the exposed portion 33 and the covered portion 36 as described earlier. Further, a depression 37 is formed as plastic deformation having a concaved shape at the boundary between the exposed portion 33 and the covered portion 36. The depression 37 is an indentation (or impression) formed on both sides of the exposed portion 33 and the covered portion 36 across the boundary therebetween by pressing the conductor segment 30 from an outside thereof.

To form the depressions 37 on the covered portion 36, the conductor 34 and the insulating film 35 were crushed all together in the above configuration. By contrast, in the following configuration, only the conductor 34 of the exposed portion 33 is crushed. In such a situation, the depression 37 formed on the covered portion 36 has a given depth measured from the insulating film 35 to a part of the conductor 34 directly under the insulating film 35. Hence, the edge of the insulating film 35 tightly adheres to the conductor 34, and accordingly, the insulating film 35 rarely unintentionally peels off therefrom. In addition, since the edge of the insulating film 35 enters the recess of the conductor 34, the insulating film 35 rarely unintentionally peels off therefrom as well.

The depression 37 is formed on each of sides of the cross section of the conductor segment 30 (i.e., around the cross section thereof). Here, the conductor segment 30 has two faces in the axial direction and two faces in the radial direction as an outer peripheral surface. Then, depressions 37 formed on the two faces in the axial direction are referred to as "depressions 37A". By contrast, depressions 37 formed on the two sides in the radial direction are referred to as "depressions 37B". When compared, each of depressions 37A and 37B has a different form from the other. However, in any of the faces, the depression 37 is commonly formed to have a given depth measured from the insulating film 35 to a part of the conductor 34 directly under the insulating film 35. Further, these two sides of the conductor segment 30 in the axial direction correspond to a laser irradiation incidence face receiving an incidence of laser irradiation and a laser irradiation absent face located opposite to the laser irradiation incidence face. The pair of radial faces include an engaging surface at which exposed portions 33 of different conductor segments 30 are engaged and ultimately joined together.

More specifically, as shown in FIG. 7B, the depressions 37A are formed on two opposite faces of the conductor segment 30 in the axial direction and are extended linearly in a direction orthogonal to a longitudinal direction of the conductor segment 30. Further, among the plastic deformation depressions 37A formed on the two axial faces, the depression 37A formed on the axial outer surface (i.e., upper face in the drawing) is located farther from the leading end of the conductor segment 30 in the longitudinal direction (i.e., left and right directions in FIG. 7A) thereof than the depression 37A formed on the axial inner face (i.e., lower face the conductor segment 30 in the drawing).

By contrast, as shown in FIG. 7A, on each of two faces of the conductor segment 30 in the radial direction, a depression 37B with a curvature forming a convex directed toward an opposite side to the leading end of the conductor segment 30 are formed between the depressions 37A formed on the faces facing to the axial direction. Hence, the depressions 37A and 37B are continuously formed surrounding four faces of the conductor segment 30 as plastic deformations.

Further, as shown in FIG. 7C, in a situation where the exposed portions 33 of the two conductor segments 30 are superimposed radially, a leading end of the exposed portion 33 of one of the conductor segments 30 and the plastic deformation depression 37B of the other one of the conductor segments 30 are opposed to each other in the longitudinal direction of the conductor segment 30. With this configuration, the exposed portions 33 of the two conductor segments 30 as superimposed can be positioned in the circumferential direction.

In particular, according to the present disclosure, since the plastic deformation depression 37B has a convex curvature convex toward the opposite side to the leading end of the conductor segment 30, the plastic deformation depression 37B functions appropriately as a positioning portion positioning the exposed portion 33. In such a situation, it is preferable if the plastic deformation depression 37B has a circular groove formed around the conductor segment 30, and a curved portion of the circular groove has substantially the same shape as a leading end of the exposed portion 33 of the conductor segment 30.

Further, as shown in FIG. 7C, the conductor segments 30 are extended in the circumferential direction from opposite sides to each other and axially outward oblique to an axial end surface of the stator core 11. Then, the exposed portions 33 of the leading ends of the conductor segments 30 are engaged and ultimately joined together. Hence, in such a situation, since a portion of the conductor segment 30 extends to the leading end, the portion thereof is increasingly located outside in the axial direction (i.e., upper side of the drawing), there is a risk that an edge of the covered portion 36 closer to the leading end of the conducting wire is highly likely to contact other parts than the stator 10 or the like after a stator winding 12 is attached to the stator core 11. In view of this, according to this embodiment, as described earlier, the depression 37A formed as the plastic deformation on the axial outer surface of the conductor segment 30 is positioned closer to the opposite side to the leading end of the conductor segment 30 than the depression 37A formed as the plastic deformation on the axial inner surface. Hence, the edge of the covered portion 36 (i.e., the depression 37A) closer to the leading end of the conductor wire is unlikely to come into contact with other components than the stator 10 on the axial outer surface of the conductor segment 30.

Next, a process of producing the leading end of the conductor segment 30 will be described with reference to FIGS. 8A and 8B. A step of producing the leading end of the conductor segment 30 includes a first sub-step of forming a plastic deformation depression 37 and a second sub-step of producing an exposed portion 33. Specifically, FIGS. 8A to 8C collectively illustrate a process of forming depressions 37 as plastic deformations. FIG. 8D illustrates a step of producing the exposed portion 33.

Hereinbelow, a process of forming the depression 37 as the plastic deformation will be described with reference to FIG. 8A. As shown in FIG. 8A, a leading end (i.e., a left end in the drawing) of the conductor segment 30 is coated with an insulating film 35 before the depression 37 is formed thereon. Then, by pressing the insulating film 35 with a given cutting tool having a given shape from above the insulating film 35, a depression 37 is formed as a plastic deformation. Here, among plastic deformation depressions 37 formed around the entire periphery of the conductor segment 30, depressions 37A are initially formed on two faces of the conductor segment 30 in the axial direction. Then, remaining depressions 37B are formed on two radial faces of the conductor segment 30.

Figure 8A:
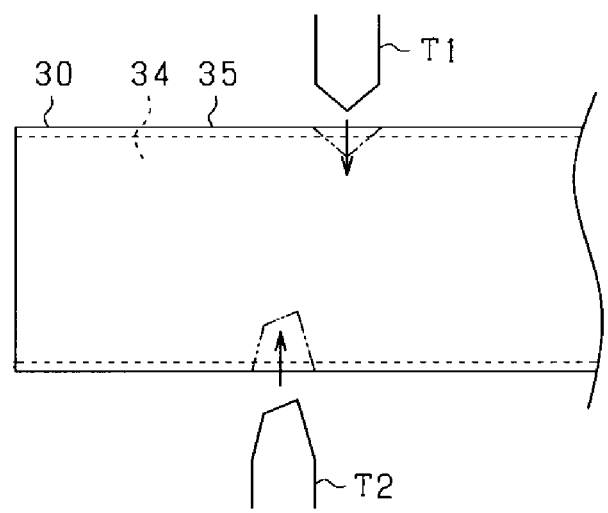
FIGS. 8A to 8D are diagrams illustrating an exemplary process of forming a leading end of the conductor segment according to one embodiment of the present disclosure.
Figure 8B:
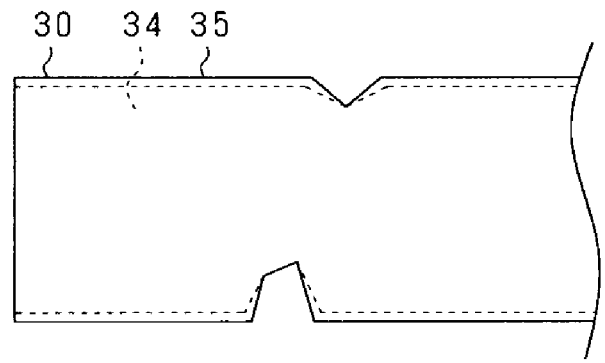

More specifically, as shown in FIG. 8A, cutting tools T1 and T2 are pressed against two faces of the conductor segment 30 in the axial direction, respectively. At this moment, the cutting tools T1 and T2 are pressed against these sides to penetrate the insulating films 35 and bite into the conductor 34 of the conductor segment 30. With this, as shown in FIG. 8B, depressions 37A are formed on the two faces in the axial direction at a depth measured from the insulating film 35 to a part of the conductor 34 directly under the insulating film 35.

Figure 8C:
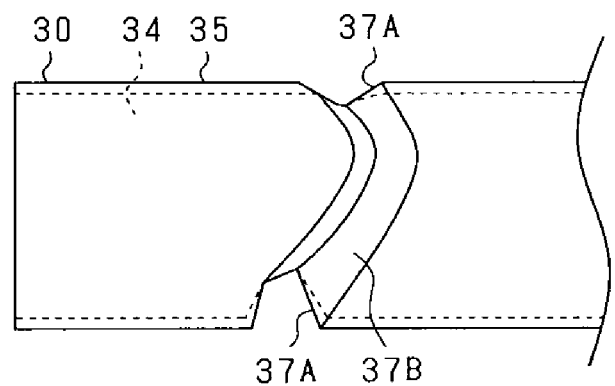
Figure 8D:
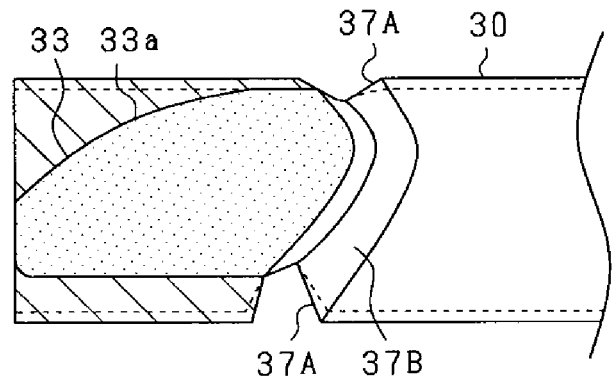

Subsequently, as shown in FIG. 8C, other depressions 37B are formed on two radial faces in the radial direction. At this moment, although cutting tools pressed against these radial faces in the radial direction are not shown, each of the cutting tools has a curved cutting edge. Thus, the cutting tools penetrate the insulating films 35 and bite into the conductor 34 when pressed against the radial faces of the conductor segment 30. With this, each of the depressions 37B is formed on the radial surface at a depth measured from the insulating film 35 to a part of the conductor 34 directly under the insulating film 35. As described heretofore, the depressions 37 are formed around a periphery of a cross section of the conductor segment 30 at the leading end thereof.

Next, a process of producing the exposed portion 33 performed after forming the depressions 37 as the plastic deformation will be herein below described with reference to FIG. 8D. This process includes a sub process of obtaining a given shape by punching the leading end of the conductor segment 30 and a sub process of peeling off the insulating film 35 from the conductor segment 30. In FIG. 8D, a hatched portion of the leading end of the conductor segment 30 is removed by punching. Hence, each of faces facing to the axial direction are formed into a given shape by the punching. At this moment, an upper face in the drawing is shaped into a convex arc state. Simultaneously, insulating films 35 extended from the depression 37A to the leading end on the two faces of the conductor segment 30 in the axial direction are removed.

Further, as shown by dots In FIG. 8D, insulating films 35 partially remain on two radial faces, respectively, at the leading end of the segment after the punching process. Then, these portions of the insulating films 35 are removed by using a laser peeling process. That is, the insulating films 35 extended to the leading end from the depression 37B are removed by using the laser peeling process from two radial faces facing to the radial direction. In this way, the exposed portion 33 is produced at the leading end of the conductor segment 30.

According to the above-described embodiment, the below described advantages can be obtained.

First, as described earlier, the depression 37 as the plastic deformation is formed at the edge of the covered portion 36 of the conductor segment 30 closer to the leading end of the conducting wire, with at least a part of the insulating film 35 being crushed. Hence, with this configuration, since the edge of the insulating film 35 tightly adheres to the conductor 34, the insulating film 35 is unlikely to peel off therefrom unintentionally. With this, the insulating film 35 on the covered portion 36 can be inhibited from peeling off from the conductor 34, so that insulation reliability of the stator winding 12 can be ensured.

Further, in particular, the depression 37 is formed at a depth measured from the insulating film 35 of the covered portion 36 to a part of the conductor 34 directly under the insulating film 35. Hence, it is possible to reduce the risk of the insulating film 35 peeling.

Further, in a configuration in which exposed portions 33 at leading ends of the respective conductor segments 30 extended from opposite sides in a circumferential direction, and are engaged and joined together, an edge of the insulating film 35 closer to a leading end of the conducting wire is likely to peel off due to contact between the conductor segments 30 or the like. However, since the depressions 37 are formed on the respective faces of the covered portion 36 in both the axial and radial directions at the edge thereof closer to the leading end of the conductor segment 30, the insulating film 35 rarely peels off therefrom even if the conductor segments 30 mutually contact to each other, for example.

Further, since the depression 37 formed at the edge of the covered portion 36 closer to the leading end of the conducting wire serves as a positioning portion for an exposed portion 33 when these exposed portions 33 are engaged with each other, the exposed portions 33 can be mutually precisely positioned. Further, if the edge of the covered portion 36 closer to the leading end of the conducting wire is used as a positioning tool in this way, another exposed portion 33 comes into contact with the edge of the covered portion 36 closer to the leading end of the conducting wires, thereby causing a risk that the insulating film 35 peels off due to contact. However, according to this embodiment of the present disclosure, since the depression 37 is formed at the edge of the covered portion 36 closer to the leading end of the conducting wire, the insulating film 35 can be inhibited from peeling off therefrom, even if another exposed portion 33 comes into contact with the edge of the covered portion 36 closer to the leading end of the conducting wires.

Further, since a shape of the depression 37 (37B) formed at the edge of the covered portion 36 closer to the leading end of the conducting wire is substantially the same as that of the leading end of the exposed portion 33, the exposed portion 33 can be precisely positioned. Further, it is also possible that the exposed portion 33 is inhibited from locally impacting against the depression 37. Hence, a configuration capable of inhibiting an insulating film from peeling off can be advantageously obtained.

Further, among the depressions 37A formed on the two axial faces at the edge of the covered portions 36 closer to the leading end of the conducting wire (i.e., which is shown as the conductor 34), the depression 37A on the axial outer face is located closer to a position opposite to the leading end of the conducting wire in the longitudinal direction of the conductor segment 30 than the depression 37A on the axial inner surface. With this, the edge (i.e., plastic deformation depressions 37) of the covered portion 36 closer to the leading end of the conducting wire become less likely to contact the other components than the stator 10 or the like on the axial outer face of the conductor segment 30. Accordingly, the insulating film 35 can be more appropriately inhibited from peeling off.

The configuration of the above-described embodiment may be modified as will be hereinbelow described.

Figure 9A:
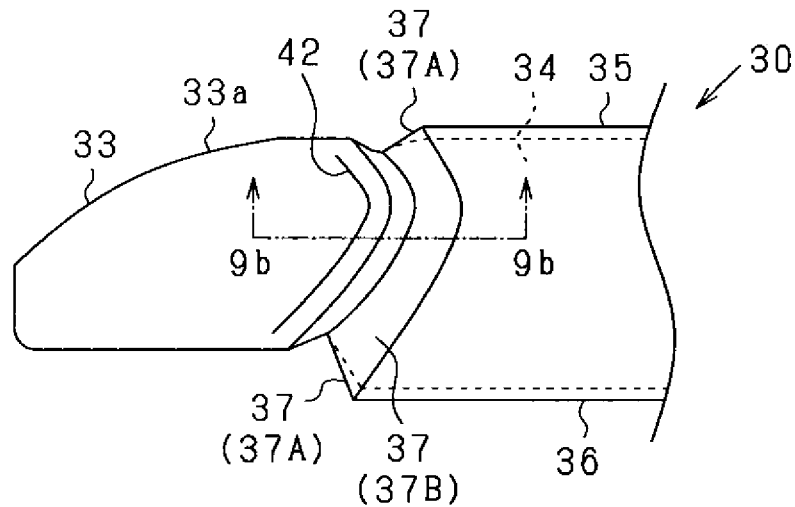
FIGS. 9A and 9B are diagrams collectively illustrating a raised portion formed in the exposed portion of the conductor segment according to one embodiment of the present disclosure.
Figure 9B:
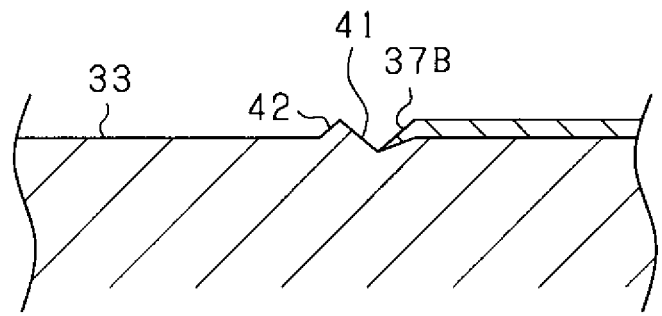

First, as shown in FIG. 9A, a recess 41 is essentially formed at a boundary between a covered portion 36 and an exposed portion 33 as a plastic deformation depression 37. In addition, a protrusion 42 can be formed at a position on the exposed portion 33 closer to a leading end of the conducting wire than the recess 41. FIG. 9B is a cross-sectional view illustrating a conductor segment 30 illustrated in FIG. 9A, along a 9b-9b line drawn in FIG. 9A. With this, the protrusion 42 inhibits another conductor segment 30 or the like from coming into contact with the edge of the insulating film 35. Hence, the insulating film 35 can be inhibited from peeling off.

Here, the protrusion 42 may be formed successively after forming the depression 37B as the plastic deformation in the process of forming the depression 37B. That is, after pressing the cutting tool for use of forming a plastic deformation depression 37B against a conductor segment 30 and forming the depression 37A thereon, thereby partially generating a thicker portion in the exposed portion 33, the cutting tool is shifted toward the leading end of the conducting wire while continuously pressing the cutting tool thereagainst, thereby forming a raised portion on the exposed portion 33. Then, the raised portion is used as the protrusion 42.

A second modification is herein below described. In the above-described embodiment, the depression 37 is formed on the covered portion 36 and the exposed portion 33 at the boundary therebetween. However, such a configuration may be modified. For example, a depression 37 as a plastic deformation is formed only on the covered portion 36 near the boundary between the covered portion 36 and the exposed portion 33. That is, the depression 37 is not formed on the exposed portion 33 even near the boundary.

Figure 10:
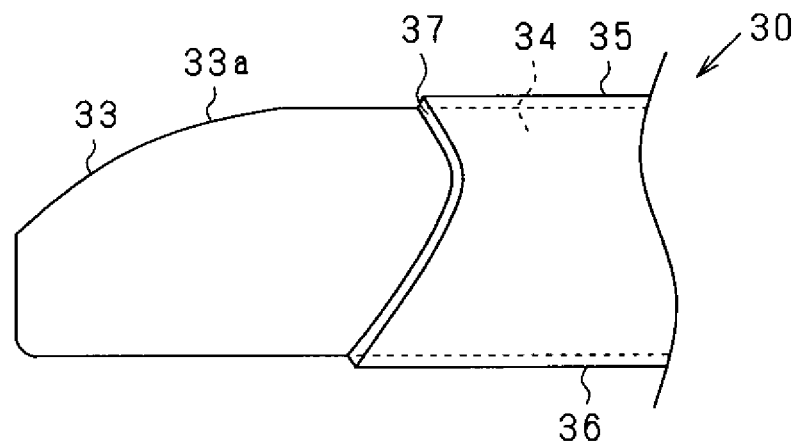
FIG. 10 is a diagram illustrating a configuration of a leading end of a conductor segment according to another example of the present disclosure.

A third modification is herein below described. In the above-described embodiment, the depression 37 is formed at the edge of the covered portion 36 of the conductor segment 30 closer to the exposed portion 33 to have a given depth measured from the insulating film 35 of the covered portion 36 to a part of the conductor 34 directly under the insulating film 35. However, such a configuration can be modified. For example, as shown in FIG. 10, a depression 37 as a plastic deformation can be formed only on the insulating film 35 at the edge of the covered portion 36 closer to the exposed portion 33. That is, the depression 37 as the plastic deformation may be formed at the edge of the covered portion 36 closer to the exposed portion 33, but is not formed directly under the insulating film 35.

Fourthly, In the above-described embodiment, the plastic deformation depressions 37 are formed over (i.e., around) the entire circumference of the cross section at the covered portion 36. However, such a configuration may be modified. For example, one or more plastic deformation depressions 37 can be formed on one, two, or three sides of a cross-sectional surface in the covering portion 36. That is, it is sufficient if the plastic deformation depression 37 is formed on one or more sides of the cross section of the end.

Further, in a situation in which the plastic deformation depression 37 is formed on one or more sides of the cross section of the end, it is preferable if the plastic deformation depression 37 is formed over the entire side, that is, from one edge to the other edge in the side.

In the above-described embodiment, in the stator winding 12, the exposed portions 33 are formed at the leading ends of each conductor segment 30 extended in the circumferential directions, and the exposed portions 33 of the leading ends 33 extended in the circumferential directions respectively are joined together by welding. However, this can be modified. For example, the leading end of each of conductor segments 30 is bent and extended outwardly in the axial direction, and exposed portions included in the leading ends respectively may be joined together by welding.

Fifthly, the stator winding 12 may not have a structure of the segment. Then, depressions as plastic deformations may be formed at an edge of the covered portion closer to the exposed portion, other than the exposed portion and the weld portion. Then, a conductor directly under an insulation film of the covered portion. Further, a round wire conductor made of conductor having a round cross section coated with an insulating film may be used. That is, multiple conductor wires are connected by welding to obtain each of phase windings for each phase of the stator winding 12.

Numerous additional modifications and variations of the present disclosure are possible in light of the above teachings. It is hence to be understood that within the scope of the appended claims, the present disclosure may be performed otherwise than as specifically described herein. For example, the present disclosure is not limited to the above-described stator and may be altered as appropriate.

What is claimed is:

1. A stator comprising:
a stator core; and
a stator winding installed in the stator core,
the stator winding being configured by including multiple conducting wires constituted by conductors respectively coated with insulating films,
each of the conducting wires comprising:
an exposed portion at a leading end, where the conductor is exposed; and
a covered portion in which the conductor remains coated with an insulating film,
wherein a pair of exposed portions of different conducting wires are joined together at a coil end section of the stator winding,
wherein the covered portion of each conducting wire of the different conducting wires has a depression as a plastic deformation at an edge thereof corresponding to the leading end of the conducting wire,
wherein the depression of the covered portion is formed by crushing the conductor and the insulating film all together on the covered portion, and has a given depth measured from the insulating film of the covered portion to a part of the conductor directly under the insulating film,
wherein an edge of the insulating film enters a depressed part of the conductor at which the depression of the covered portion is formed,
wherein the exposed portion has a depression,
wherein the depression of the covered portion and the depression of the exposed portion are formed across a boundary of the depression of the covered portion and the depression of the exposed portion, and
wherein a depth of the depression of the covered portion at the boundary is deeper than an adjacent part that is not depressed to the boundary of the exposed portion.

2. The stator as claimed in claim 1,
wherein the conducting wire is a rectangular conducting wire having a rectangular cross-section,
wherein the coil end section is configured by connecting a leading end of the conducting wire extended in a first circumferential direction and a leading end of the other conducting wire extended in a second circumferential direction opposite to the first circumferential direction at an outside of the stator core in an axial direction of the stator core,
wherein the exposed portions of the different conducting wires are engaged side by side with each other in a radial direction of the stator core and are joined together by welding, and wherein the depression of the covered portion is formed on surfaces of the covered portion, facing to the axial direction and the radial direction, respectively, at the edge of the covered portion corresponding to the leading end of the conducting wire in each of the different conducting wires.

3. The stator as claimed in claim 2, wherein the depression of the covered portion formed on a radial face at the edge of the covered portion of each of the different conducting wires serves as a positioning member for positioning the exposed portion when the exposed portions of different conducting wires are joined together.

4. A stator comprising:
a stator core; and
a stator winding installed in the stator core,
the stator winding being configured by including multiple conducting wires constituted by conductors respectively coated with insulating films,
each of the conducting wires having;
an exposed portion at a leading end, where the conductor is exposed, and
a covered portion in which the conductor remains coated with the insulating film,
wherein a pair of exposed portions of different conductor wires are joined together at a coil end section of the stator winding,
wherein the covered portion of each of the different conducting wires has a depression as a plastic deformation at an edge thereof closer to the leading end of the conducting wire, the depression being formed by crushing a part of the insulating film at the edge of the covered portion,
wherein the conducting wire is a rectangular conducting wire having a rectangular cross-section,
wherein the coil end section is configured by connecting a leading end of the conducting wire extended in a first circumferential direction and a leading end of the other conducting wire extended in a second circumferential direction opposite to the first circumferential direction at an outside of the stator core in an axial direction of the stator core,
wherein the exposed portions of the different conducting wires are engaged side by side with each other in a radial direction of the stator core and are joined together by welding,
wherein the depression is formed on surfaces of the covered portion, facing to the axial direction and the radial direction, respectively, at the edge of the covered portion corresponding to the leading end of the conducting wire in each of the different conducting wires,
wherein the conducting wires extended in the first and second circumferential directions are extended outwardly in the axial direction obliquely to an axial end face of the stator core at a given angle,
wherein among the two depressions formed on two opposite surfaces perpendicular to the axial direction at the edge of the covered portion closer to the leading end of the conducting wire, the depression formed on an axial inner surface is located closer to the leading end of the conducting wire in a longitudinal direction of the conducting wire than the depression formed on an axial outer surface is.

5. The stator as claimed in claim 1, wherein the exposed portion is configured to include:
a recess as the depression of the exposed portion; and a protrusion formed closer to the leading end of the conducting wire than the recess is.

* * * * *